United States Patent [19]

van Megen

[11] 4,244,973

[45] Jan. 13, 1981

[54] PROCESS FOR PRODUCING A DETOXIFIED RAPESEED PROTEIN CONCENTRATE

[75] Inventor: Wilhelmus H. van Megen, Zevenaar, Netherlands

[73] Assignee: Lever Brothers Company, New York, N.Y.

[21] Appl. No.: 50,384

[22] Filed: Jun. 20, 1979

[30] Foreign Application Priority Data

Jun. 26, 1978 [GB] United Kingdom ............. 27852/78

[51] Int. Cl.$^3$ .............................................. A23J 3/00
[52] U.S. Cl. ...................................... 426/49; 426/52; 426/629; 426/656; 260/123.5
[58] Field of Search .................... 426/49, 52, 53, 629, 426/656; 260/123.5

[56] References Cited

U.S. PATENT DOCUMENTS

| | | | |
|---|---|---|---|
| 2,474,650 | 6/1949 | Birdseye | 426/52 |
| 4,015,019 | 3/1977 | Sawada et al. | 426/52 X |
| 4,085,229 | 4/1978 | Staron | 426/53 X |
| 4,119,733 | 10/1978 | Hsieh et al. | 426/49 X |

FOREIGN PATENT DOCUMENTS 596152  4/1960  Canada ..................................... 426/52

OTHER PUBLICATIONS

Mustakas, G. C. et al., "Mustard Seed Processing: Improved Methods for Isolating the Pungent Factor and Controlling Protein Quality", JAOCS, Jan. 1965, vol. 42, pp. 33-37.

*Primary Examiner*—Robert A. Yoncoskie

[57] ABSTRACT

A process for the detoxification of rapeseed which involves (a) autolyzing an aqueous mixture of rapeseed meal in the presence of myrosinase and ascorbic acid to achieve hydrolysis of glucosinolates present in the meal and (b) extracting the toxic products resulting from the hydrolysis of said glucosinolates using a polar, organic solvent. The detoxified rapeseed protein concentrate obtained according to the invention is a useful ingredient in foodstuffs for both human and animal consumption.

18 Claims, No Drawings

PROCESS FOR PRODUCING A DETOXIFIED RAPESEED PROTEIN CONCENTRATE

The invention relates to a process for the detoxification of rapeseed and particularly to a process for producing a rapeseed protein concentrate which is substantially free of toxic components and their precursors.

Rapeseed protein is a valuable ingredient in food products and is reported to be appreciated in view of its emulsifying and foaming properties. Unfortunately, rapeseed flours, concentrates and sometimes isolates cannot be used without having been subjected to a detoxification process to remove glucosinolates or toxic products resulting from the hydrolysis of glucosinolates, such as nitriles, isothiocyanates, such as [3-butenyl isothiocyanate], (ITC) and 5-vinyl oxazolidine-2-thione (VO), under the influence of the endogenous enzyme myrosinase.

Several methods have been proposed for detoxifying rapeseed. These methods involve a chemical treatment, a heat treatment, fermentation or a solvent extraction. Chemical treatments were carried out using e.g. ammonia, calcium hydroxide or ferrous salts which convert the glucosinolates or their hydrolysis products into less harmful compounds. The level of toxic components in the detoxified products is, however, such that the products have only prospects for application in animal feeding. The heat treatment of rapeseed achieves inactivation of myrosinase before hydrolysis of glycusinolates occurs. However, glucosinolates could be hydrolysed afterwards by thioglucosidases present in the diet or by bacteria in the intestinal tract.

Detoxification by fermentation can be carried out using *Geotrichum candidum*. Unfortunately, one of the toxic components 5-vinyloxazolidine-2-thione, the so-called goitrin, is only partially removed and the product is still unsafe.

Solvent extraction involves the use of water and/or organic solvents and achieves the removal of toxic components and oligosaccharides, pigments and off-flavour components.

A drawback associated with solvent extraction is often the decrease of functionality of the protein, the unacceptable level of toxic components and the low protein yields.

We have found a process for detoxifying rapeseed, which results in products which are satisfactory and safe for both human and animal consumption.

The process according to the invention comprises:
(a) autolysing a mixture essentially consisting of rapeseed meal, water, myrosinase and ascorbic acid, to achieve hydrolysis of glucosinolates present in the meal;
(b) extracting the autolysed mixture with a polar, organic solvent;
(c) separating the solvent phase which contains the products of the hydrolysis of glucosinolates, from the protein-containing residue;
(d) drying the residue to obtain a rapeseed protein concentrate substantially free of toxic components.

The rapeseed meal can be a full-fat or a defatted meal. Defatted rapeseed meal is preferably used. The defatted rapeseed meal is one which is obtained by extraction of the fats from full-fat meal with an organic solvent such as hexane.

The meal can be a toasted meal, which means a meal which has been heat-treated at 60°–100° C., or an untoasted meal. Preferably meal toasted at 60°–75° C. is used since this treatment allows a more efficient extraction of undesired components in step b).

A suitable aqueous mixture of rapeseed meal is prepared by mixing the meal with preferably as little water as possible to avoid the use of large quantities of organic solvent in the subsequent extraction operation. Suitable water to solid ratio may vary from 1.5 to 3:1. The mixture is allowed to autolyse or incubate at a temperature which may vary from 30° to 75° C. but which preferably lies within the range of from 40° to 60° C., at which temperature hydrolysis of glucosinolates due to the activity of the enzyme myrosinase present in the meal can be optimally achieved. Incubation is preferably carried out while stirring the mixture for a period which may vary from 30–90 minutes to achieve a complete hydrolysis of glucosinolates. The incubation time depends, of course, amongst other things on the activity of the myrosinase present in the meal and can easily be established in each particular case. Autolysis of the aqueous mixture of rapeseed meal can suitably be performed at a pH varying from 5.0 to 7.0 and preferably at a pH of 5.7, which is the natural pH of rapeseed meal in water. Although the pH of the mixture could advantageously be raised from 5.7 to 7.0 by adding an alkali, this is not practical since pH 7.0 is only reached after a long equilibration period. Incubation is stopped when the measured amount of VO and ITC stops increasing. The ascorbic acid can be used according to the invention in a proportion ranging from 0.1 to 1.0% and preferably from 0.2 to 0.6% based on the weight of the meal.

It is believed that myrosinase in the meal, particularly in toasted meal, is very often present in an insufficiently active form and that ascorbic acid plays an essential role in activating myrosinase according to a mechanism which is not yet fully understood.

We have found that addition of extraneous, fresh myrosinase influences the reaction favourably.

It is therefore useful for obtaining optimal results to increase the level of myrosinase naturally occurring in the meal by incorporating in the aqueous mixture some fresh, undenatured myrosinase, e.g. in the form of finely divided mustard seed. Useful proportions of mustard seed are 1–4% based on the weight of the meal. This addition of mustard seed is particularly useful when mildly heat-treated meal, i.e. meal toasted at 60°–75° C., is used.

Step (b) can be carried out using a polar organic solvent such as methanol, ethanol, isopropanol, acetone. Preferably aqueous mixtures of the organic solvent are used. The water content of the solvent mixture should be sufficiently low to avoid denaturation of the protein during extraction, but on the other hand the water content should be such as to achieve an efficient extraction of polar, toxic components and sugars, which are present as well. Preferably extraction is carried out with a solvent mixture containing 60–80% of the organic solvent. Ideally, aqueous 60–80% ethanol is used. The desired concentration is achieved e.g. by adding an appropriate volume of pure solvent e.g. absolute ethanol to the aqueous mixture of rapeseed meal.

The solid/solvent ratio applied in the extraction step (b) may vary within a wide range. Preferably a 1:5–1:15 ratio is applied. The extraction temperature can be varied within a wide range but preferably lies between 20° and 60° C. to avoid denaturation of the protein. The solvent containing the extracted components, mainly consisting of ITC and VO, is subsequently separated from the solid protein material in a way known per se such as decantation, centrifugation etc. The protein material can be extracted and washed several times with the aqueous solvent to remove any undesirable components.

The solid protein material is subsequently dried, preferably air-dried at room temperature and ideally under reduced pressure, at a temperature preferably varying from 50°–80° C., to avoid undue degradation of the protein, to a mixture content preferably below 5%.

The VO content in concentrates prepared according to the invention mostly varied from 0 to about 0.009%. The ITC content in concentrates prepared according to the invention varied from 0 to about 0.004%, and were therefore suitable for human consumption. The invention will now be illustrated by the following Examples.

EXAMPLE 1

10 kg of defatted rapeseed meal were mixed with 200 g of mustard seed meal. To this mixture were added 28 g of ascorbic acid dissolved in 20 l of water. The mixture was kept for 30 minutes at 40° C. while stirring. 89 l of 96% ethanol were added and the temperature was raised to 50° C. and the mixture was kept at this temperature while stirring. The liquid phase was then separated from the solid residue by filtration. The residue was washed twice with totally 50 l of 75% ethanol followed by a last wash with 96% ethanol. The residue was dried at 70° C. under reduced pressure to a moisture content of 5%.

The protein concentrate was analysed for 5-vinyloxazolidine-2-thione (VO) and [3-butenyl isothiocyanate] (ITC). Both levels were below the analytically detectable values. The analytical procedure for determining VO and ITC were as follows:

Determination of VO

(a) Incubation 45 ml of a boiling 0.05 M $Na_2HPO_4$ solution are added to 1 g of rapeseed meal. The mixture is kept boiling for 5 minutes. After cooling to room temperature 5 ml of ascorbic acid solution (1.5% in water) and 20 mg of mustard seed meal are added and then the mixture is incubated at 35° C. for 30 minutes in a shaking bath.

(b) Extraction

VO is extracted from the mixture by vigorous shaking with 50 ml of ether for 1 minute and then centrifuged in a closed tube. 2 ml of the clear extract is diluted to 25 ml with ether.

(c) Measurement

UV absorption of the diluted ether extract is measured, using a 1 cm cell, at 230–248 and 266 nm.

(d) Calculation $$\%VO = (E_{248} - \frac{E_{230} + E_{266}}{2}) \times 1.074.$$

Determination of ITC

(a) Incubation 150 ml of boiling phosphate buffer (0.04 M $Na_2HPO_4$, 0.25 M $KH_2PO_4$) are added to 10 g of rapeseed meal and kept boiling for 5 minutes. After cooling 10 ml of ascorbic acid solution (1.5% in water) and 2 g of mustard seed meal are added and then the mixture is incubated at 35° C. for 60 minutes in a shaking bath.

(b) Distillation 20 ml of ethanol are added to the mixture and then the ITC is transferred by steam distillation into 20 ml of 0.1 N $AgNO_3 + 5$ ml of concentrated (25%) ammonia. After distillation the cooler is rinsed with a mixture of 2 ml of concentrated ammonia and 8 ml of ethanol which is then added to the ITC containing $AgNO_3$ solution.

The ITC solution is heated at 90° C. for 30 minutes in order to aggregate the AgS formed. Then water is added to make the volume 100 ml. After filtration (S & S filter no 589), 50 ml of water and 3.5 ml of concentrated (65%) $HNO_3$ are added.

(c) Measurement

The solution is titrated according to Vollhard with 0.1 N ammonium thiocyanate solution. A blank determination, including the complete procedure but without rapeseed meal, is also carried out.

(d) Calculation

The ITC content is calculated as allyl isothiocyanate according to the followinhg equation:

$$\%ITC = 0.0992(V_o - V)$$

where $V_o$ and $V$ are the number of ml's of $NH_4CHS$ solution used for titrating the blank and the sample respectively.

EXAMPLE 2

Example 1 was repeated without the addition of mustard seed meal. To achieve the same degree of detoxification an incubation period of 1 hour was required.

EXAMPLE 3

The procedure of Example 2 was repeated, except that 50 g of ascorbic acid were added. The protein concentrate had VO- and ITC- levels which were below the analytically detactable values.

EXAMPLE 4

The procedure of Example 2 was repeated starting this time from rapeseed meal which had been toasted at 70° C., and using 10 g of ascorbic acid. The VO- and ITC- levels were both below 0.01%.

EXAMPLE 5

The procedure of Example 1 was repeated, except that the extraction was performed with 80% methanol. The VO- and ITC- levels were below 0.01%.

EXAMPLE 6

The procedure of Example 1 was repeated, except that the extraction was performed with 70% isopropanol. The VO- and ITC- levels were below 0.01%.

EXAMPLE 7

The procedure of Example 1 was repeated, except that the extraction was performed with 75% acetone. The VO- and ITC- levels were below 0.01%.

I claim:

1. A process for producing a detoxified rapeseed protein concentrate, which comprises:
    (a) producing a mixture consisting essentially of rapeseed meal water, myrosinase and ascorbic acid, in which the proportion myrosinase is at least equal to that naturally present in said meal and wherein said ascorbic acid is present in amounts sufficient to activate said myrosinase, (b) autolysing said mixture for a period of time and at a temperature such that hydrolysis of glucosinolates present in the meal is achieved, (c) adding to the autolysed mixture an appropriate proportion of a polar, organic solvent to obtain a solvent phase in which the water content is on the one hand sufficiently low to avoid denaturation of the protein present in the meal and on the other hand sufficiently high to achieve an efficient extraction of toxic components and sugars from the meal, (d) extracting the autolysed mixture with the polar, organic solvent for a period of time and at a temperature sufficient to achieve an efficient extraction of toxic components and sugars from the meal, (e) separating the solvent phase which contains the products of the hydrolysis of glucosinolates from the protein-containing residue, and (f) drying the residue to obtain a rapeseed protein concentrate substantially free of toxic components.

2. A process according to claim 1, in which defatted rapeseed meal is used.

3. A process according to claim 1, in which meal toasted for 1 to 30 minutes at a temperature varying from 60° to 100° C. is used.

4. A process according to claim 3, in which meal toasted at 60° to 75° C. is used.

5. A process according to claim 1, in which the ratio water:meal varies from 1.5:1 to 3:1.

6. A process according to claim 1, in which autolysis is carried out at a temperature varying from 30° to 75° C.

7. A process according to claim 6, in which a temperature varying from 40° to 60° C. is applied.

8. A process according to claim 6 or claim 7, in which autolysis is carried out for 30 to 90 minutes.

9. A process according to claim 1, in which 0.1–1.0% ascorbic acid based on the weight of the meal is used.

10. A process according to claim 9, in which 0.2–0.6% by weight of ascorbic acid is used.

11. A process according to claim 1, in which the level of myrosinase naturally occurring in the meal is increased by incorporating in the aqueous mixture an additional proportion of myrosinase.

12. A process according to claim 11, in which myrosinase is added in the form of finely divided mustard seed in a proportion of 1 to 4% based on the weight of the meal.

13. A process according to claim 1, in which step (c) involves using aqueous ethanol.

14. A process according to claim 13, in which 60–80% ethanol is used.

15. A process according to claim 1, in which in step (c) a solid/solvent ratio varying from 1:5 to 1:15 is applied.

16. A process according to claim 1, in which the extraction step (c) is carried out at a temperature varying from 20° to 60° C.

17. A process according to claim 1, in which the residue is dried under subatmospheric pressure at a temperature varying from 50° to 80° C., to a moisture content of less than 5%.

18. A process for producing a detoxified rapeseed protein concentrate, which comprises:

(a) producing a mixture consisting essentially of rapeseed meal, water, myrosinase and ascorbic acid, in which the ratio of water:meal ranges from 1.5:1 to 3:1, the proportion of myrosinase is at least equal to that naturally present in rapeseed meal and the proportion of ascorbic acid ranges from 0.1–1.0%, based on the weight of the meal, (b) autolysing said mixture for a period of time and at a temperature such that hydrolysis of glycosinolates present in the meal is achieved, (c) adding to the autolysed mixture an appropriate proportion of a polar, organic solvent to obtain a solvent phase having a water content ranging from 20–40%, (d) extracting the autolysed mixture with the polar, organic solvent for a period of time and at a temperature sufficient to achieve an efficient extraction of toxic components and sugars from the meal, (e) separating the solvent phase which contains the products of the hydrolysis of glycosinolates from the protein-containing residue, and (f) drying the residue to obtain a rapeseed protein concentrate substantially free of toxic components.

* * * * *